United States Patent
Goisot et al.

(10) Patent No.: US 10,898,910 B2
(45) Date of Patent: Jan. 26, 2021

(54) GENERATOR USABLE IN A POTENTIALLY EXPLOSIVE ATMOSPHERE AND ASSEMBLY COMPRISING AN ELECTROSTATIC SPRAYER AND SUCH A GENERATOR

(71) Applicant: EXEL INDUSTRIES, Epernay (FR)

(72) Inventors: Gilles Goisot, Paris (FR); Rémi Pagot, Paris (FR)

(73) Assignee: EXEL INDUSTRIES, Epernay (FR)

( * ) Notice: Subject to any disclaimer, the term of this patent is extended or adjusted under 35 U.S.C. 154(b) by 208 days.

(21) Appl. No.: 16/029,584

(22) Filed: Jul. 7, 2018

(65) Prior Publication Data

US 2019/0015852 A1      Jan. 17, 2019

(30) Foreign Application Priority Data

Jul. 13, 2017   (FR) ..................... 17 56708

(51) Int. Cl.
| | | |
|---|---|---|
| *B05B 5/053* | (2006.01) | |
| *H01M 2/02* | (2006.01) | |
| *H01M 2/10* | (2006.01) | |
| *H02P 9/00* | (2006.01) | |
| *B05D 1/04* | (2006.01) | |
| *B05B 12/00* | (2018.01) | |

(Continued)

(52) U.S. Cl.
CPC .......... *B05B 5/0531* (2013.01); *H01M 2/029* (2013.01); *H01M 2/1055* (2013.01); *H01M 2/1094* (2013.01); *H02P 9/006* (2013.01); *B05B 12/004* (2013.01); *B05D 1/04* (2013.01); *H01B 3/30* (2013.01); *H01M 10/0525* (2013.01); *H01M 2220/30* (2013.01)

(58) Field of Classification Search
CPC ... B05B 5/0531; B05B 12/004; B05B 5/1691; H01M 2/029; H01M 2/1055; H01M 2/1094; H01M 10/0525; H01M 2220/30; H02P 9/006; B05D 1/04; Y02E 60/10; H01B 3/30

See application file for complete search history.

(56) References Cited

U.S. PATENT DOCUMENTS 4,491,276 A * 1/1985 Reeves ................. F01D 15/062
                                                              239/692
5,240,186 A * 8/1993 Dobbins .................. B05B 5/03
                                                              239/154

(Continued)

FOREIGN PATENT DOCUMENTS

DE          3126936 A1     2/1983
DE    202014004365 U1     9/2015
(Continued)

OTHER PUBLICATIONS

AtexSystem: "Ex-KFF30*CH-J-E Spot Atex LED 30W," Jan. 17, 2016 http://www.atex-system-com/pdf/Ex-KFF30_C-J-E_Atex_30W_LED_FR_REVO.pdf.

(Continued)

*Primary Examiner* — Daniel J Cavallari
(74) *Attorney, Agent, or Firm* — Soquel Group LLC

(57) ABSTRACT

A generator usable in an explosive atmosphere zone, and having a power greater than or equal to 8 Watts, preferably greater than 10 Watts, and an assembly including an electrostatic sprayer for a coating product and the generator.

13 Claims, 3 Drawing Sheets

(51) Int. Cl.
   *H01B 3/30* (2006.01)
   *H01M 10/0525* (2010.01)

(56) References Cited

U.S. PATENT DOCUMENTS

| | | | | |
|---|---|---|---|---|
| 7,550,943 B2* | 6/2009 | Spartano | ............... | H02J 1/00 |
| | | | | 320/107 |
| 2011/0199204 A1* | 8/2011 | Dionis | ............... | E05B 45/005 |
| | | | | 340/506 |
| 2014/0110493 A1* | 4/2014 | Cooper | ............... | B05B 5/087 |
| | | | | 239/3 |
| 2017/0291181 A1* | 10/2017 | Wright | ............... | B05B 5/03 |
| 2017/0292236 A1* | 10/2017 | Storm | ............... | B60R 16/033 |
| 2019/0308023 A1* | 10/2019 | Hovland | ............... | A61N 1/378 |

FOREIGN PATENT DOCUMENTS

| | | |
|---|---|---|
| FR | 2374964 A1 | 7/1978 |
| WO | 20020050988 A1 | 6/2002 |

OTHER PUBLICATIONS

French Patent Application No. 17 56708, INPI Rapport de Recherche Préliminaire, Mar. 2, 2018, 1 page.

\* cited by examiner

GENERATOR USABLE IN A POTENTIALLY EXPLOSIVE ATMOSPHERE AND ASSEMBLY COMPRISING AN ELECTROSTATIC SPRAYER AND SUCH A GENERATOR

CROSS REFERENCE TO RELATED APPLICATIONS

This application claims priority under 35 USC § 119 of French Patent Application No. 17 56708 filed on Jul. 13, 2017.

FIELD OF THE INVENTION

The present invention relates to a generator usable in a potentially explosive atmosphere. In particular, such a generator can be used to supply an electrostatic sprayer with a coating product. The invention therefore also relates to an assembly comprising the sprayer and the generator.

BACKGROUND OF THE INVENTION

In the field of the coating of objects, the object(s) to be coated are nearly systematically arranged in a closed booth, which is called spraying booth. One or several operators, with specialized equipment, enter the booth to spray the coating product on the surfaces of the object present in the booth. To that end, the operators use manual spray guns, and in particular electrostatic guns. This type of gun comprises a high-voltage unit to bring the coating product to the high voltage, and thus to guide the droplets of sprayed product at the outlet of the gun toward the part to be coated, which is connected to the ground. Thus, at least one power cable connects the gun to a high-voltage generator. Additionally, the guns comprise an air intake, which is described as spraying air, to spray the product in the form of a spray.

In certain applications, for example aeronautics, several layers of product are sprayed, including a lacquer layer, a primer layer, a bonding layer and a paint layer, in particular a dual-component solvent-based paint. The bonding layer is alcohol-based. Furthermore, the solvent of the paint often comprises potentially flammable chemical substances.

Thus, the solvent and alcohol vapors make the atmosphere inside the booth explosive. This is called an explosive atmosphere zone (or ATEX zone). As a result, the high-voltage generator is logically arranged outside the booth. This is, however, problematic for large booths, such as the boots used in aeronautics to paint the cockpit of an airplane, since it is not possible to consider having a booth measuring several tens, or even hundreds of meters between the operator and the generator.

FIG. 2 of GB 1,198,480 discloses a handheld sprayer comprising a high-voltage unit powered by a portable generator designed in the form of a backpack. However, this generator is not approved for an ATEX zone. Furthermore, the high voltage level used is around 1 kV, which is largely insufficient to obtain an electrostatic effect, i.e., real guiding of the particles of paint toward the surface to be coated, given that the electrostatic effect is generally observed from 15 kV and, to decrease losses, it is preferable to use a high voltage level comprised between 50 kV and 60 kV, or an intensity of around 80 µA (microampere). Lastly, with the techniques used at this time, this generator would weigh around 70 kg, which had a considerable impact on operator mobility. In particular, with such equipment, the operator could not climb up on scaffolding, for example to paint the roof of a cockpit. Additionally, the autonomy was very low, such that this equipment was ultimately not of great practical interest.

Currently, the autonomous generators approved for ATEX zones have a power that does not exceed 3 or 4 W. This is due to the difficulties encountered during the certification of the equipment. Some certification bodies refuse to examine any file in which these values are exceeded. Yet for an electrostatic application, a power at the end of the gun is needed of at least 4 Watts ($P=U*I$, or $50 kV*80 \mu A=4 W$), or a generated power at least equal to 8 W, knowing that the output is about 0.5.

SUMMARY OF THE DESCRIPTION

The invention more particularly aims to resolve these drawbacks by proposing a generator usable in an ATEX zone and powerful enough to power an electrostatic sprayer.

To that end, the invention relates to a generator usable in an explosive atmosphere zone, and having a power greater than or equal to 8 Watts, preferably greater than 10 Watts.

The fact that the generator can be used in an explosive atmosphere can be verified directly and successfully using tests and procedures that are well known in the field of ATEX zone safety.

According to advantageous, but optional aspects of the invention, the generator may comprise one or more of the following features, considered in any technically allowable combination:

- The mass of the generator is below 2 kg and the volume of the generator is below 2000 cubic centimeters.
- The generator comprises at least one battery element, preferably several battery elements together forming a battery.
- The generator comprises a system for disconnecting each battery element when the generator is turned off.
- Each battery element, and in particular each of the connection terminals of the battery element(s), comprises an outer overmolding made from an electrically insulating material.
- The generator is designed to power an electrostatic sprayer.
- The generator comprises electronic energy conversion components, these components preferably being encapsulated inside a resin enclosure.
- Each electronic component is provided in several copies and/or dimensioned to work below capacity relative to its rated power under normal operating conditions of the generator, in particular at one third of its rated power.

The invention also relates to an assembly comprising an electrostatic sprayer for a coating product and a generator as previously described.

Preferably, the assembly comprises a compressed air source connected to the ground and at least one air intake hose connecting the source to the sprayer, the air intake hose having an electric resistance below 1 MOhm, so as to connect the sprayer to the ground, at least one electrically conductive cable connecting the generator and the sprayer, so as to connect the generator to the ground.

Preferably, the assembly comprises a product supply source connected to the ground and at least one product intake hose connecting the source to the sprayer, the product intake hose having an electric resistance below 1 MOhm, so as to connect the sprayer to the ground, at least one electrically conductive cable connecting the generator and the sprayer, so as to connect the generator to the ground.

Preferably, the air intake hose and/or the product intake hose has a resistance per unit length below 20 kOhm per meter.

BRIEF DESCRIPTION OF THE DRAWINGS

The invention and other advantages thereof will appear more clearly, in light of the following description of one embodiment of a generator according to its principle, provided solely as an example and done in reference to the appended drawings, in which.

DETAILED DESCRIPTION

FIGS. 1 to 4 show, in perspective and sectional view, a generator 2 usable in an explosive atmosphere zone 5 (ATEX zone). The ATEX zone 5 is shown schematically by an inset in FIG. 5. Typically, the ATEX zone 5 is formed by the inner volume of a spray booth, in particular a large booth intended to receive the cockpit of an airplane.

The generator 2 has a power greater than or equal to 8 Watts, preferably greater than 10 Watts. In this way, the generator 2 is capable of delivering sufficient electrical power to power an electrostatic sprayer 4 for a coating product, which is shown schematically in FIG. 4. The coating product may be paint, varnish, a primer, a sealant, etc.

Figure 1:
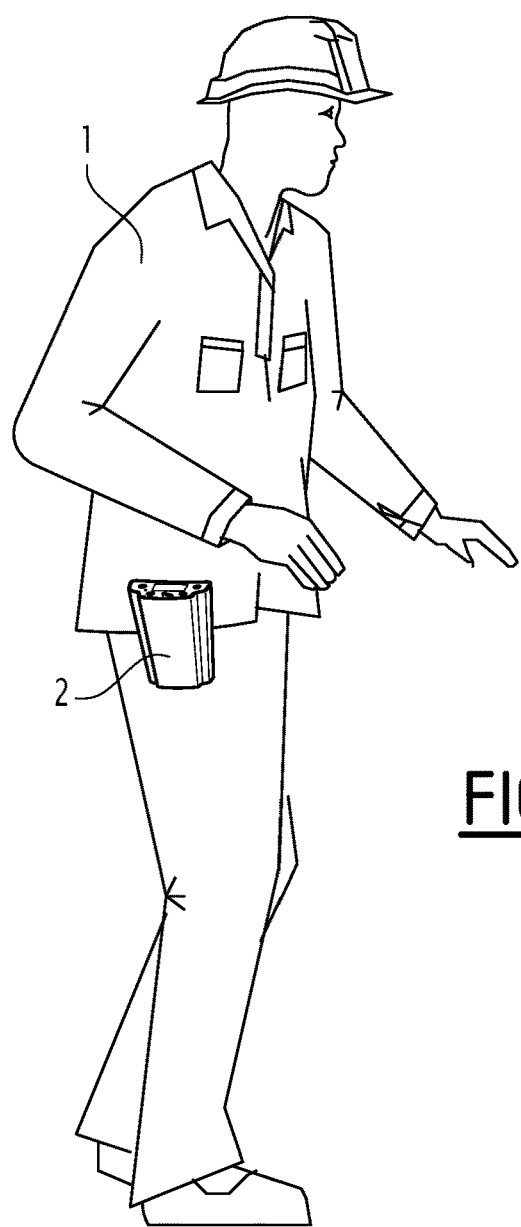
FIG. 1 is a schematic perspective view showing the generator according to the invention attached to the belt of an operator.

As shown in FIG. 1, the generator 2 comprises a housing 20. Here, the mass of the generator is advantageously below 2 kg and its volume is below 2000 cc. Thus, the generator 2 is compact and light enough to be able to be transported by an operator 1, in particular on the belt. To that end, in the example of FIGS. 1 and 2, the generator 2 comprises a belt clip 3.

Advantageously, the generator 2 comprises at least one, preferably several battery elements 22. The single element 22 or the set of elements 22 forms a battery 23. Each battery element 22 delivers a voltage of about 10 to 18 V. At a maximal charge, the elements 22 deliver a voltage of about 16 V to 18 V.

In the example, there are four elements 22 that are connected two by two in series in order to form two subassemblies. The two subassemblies are connected in parallel. Thus, each subassembly delivers a voltage of about 20 to 36 V. In this way, the generator can operate even when one or two elements 22 are faulty, and even in case of thermal runaway of one of the elements 22. Thus, the safety of people and property is not affected.

Here, the battery elements 22 are of the lithium-ion type. The elements 22 give the generator a certain autonomy, in that the generator 2 can operate while being disconnected from any electrical energy source, such as the grid. This is called an "autonomous generator".

Optionally, the generator 2 comprises a system (not shown) for disconnecting each battery element 22 when the generator 2 is turned off. In this way, the elements 22 do not withdraw current when the generator 2 is not in use.

Each element 22 comprises an outer overmolding (not shown), in which vents are arranged. These vents make it possible to discharge the gaseous releases from the batteries 22. Furthermore, each battery element 22 is equipped with a mechanical fuse (not shown) that makes it possible to limit the pressure from the gases if the vent fails.

Advantageously, the overmolding of each element 22 is made from an electrically insulating material, for example a plastic material. The connection terminals (+ and −) of each element 22 are also overmolded, which creates an insulating layer between the two terminals. Owing to this layer, the physical distance between the two terminals of each battery element can be reduced, which makes it possible to gain compactness. As an example, the thickness of the generator is reduced by about 15 mm, i.e., a gain of about 20%.

In the example, the generator 2 comprises an electronic conversion part formed by a set of electronic energy conversion components 24.

In the example, the electronic components 24 belong to a printed circuit board (PCB), i.e., a substrate making it possible to maintain and electrically connect the electronic components 24 to one another. In particular, the printed circuit board is a multi-layer circuit board, including at least three conductive layers, separated from one another by insulating layers.

Figure 3:
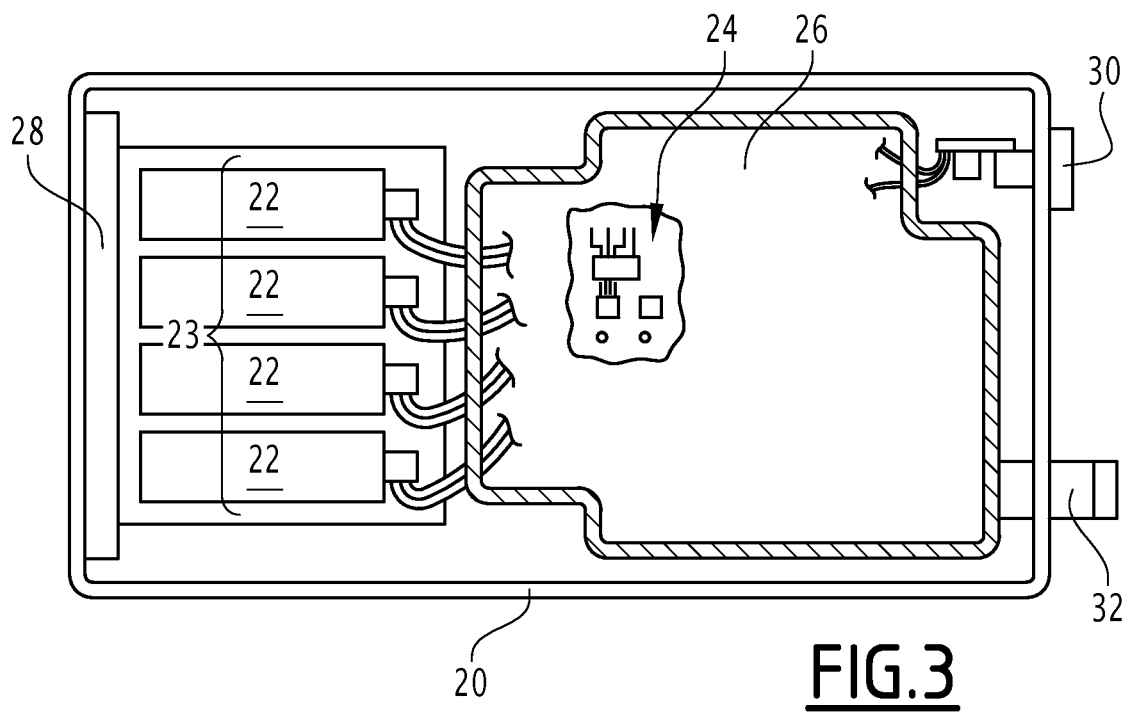
FIG. 3 is a schematic sectional view of the generator of FIGS. 1 and 2.
Figure 4:
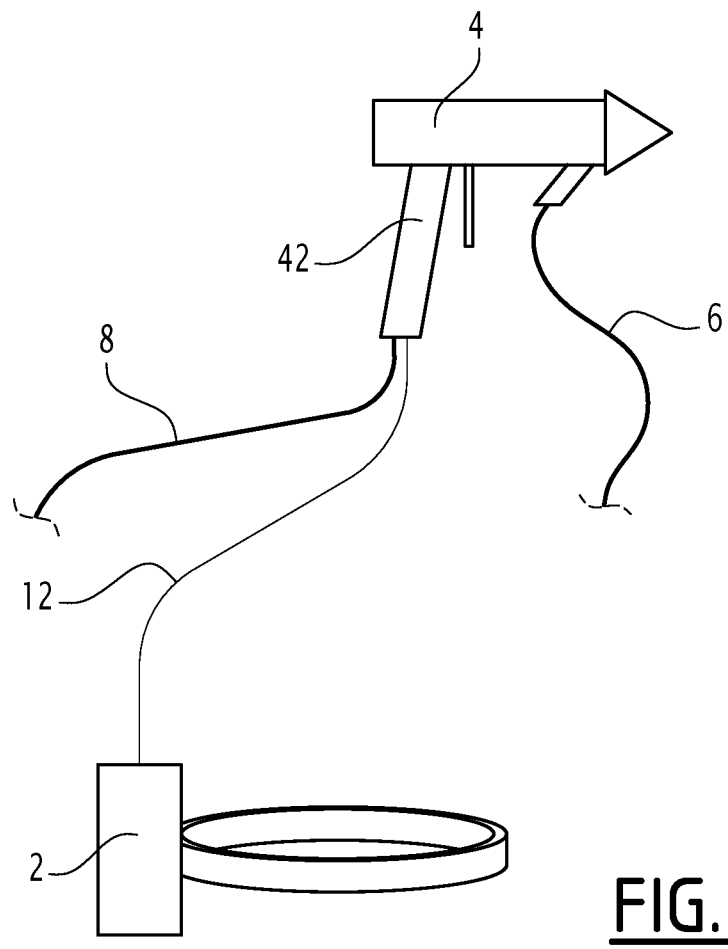
FIG. 4 is a diagram of an assembly comprising the generator and an electrostatic sprayer connected to the generator.

As shown in FIG. 3, these components 24 are housed inside an enclosure 26 and embedded inside an insulating material, of the resin type, shown symbolically with a material cutaway to make it possible to view the electronic components 24. This resin is a resin specific to protection in an explosive atmosphere, which is generally of the epoxy and/or polyurethane type.

The elements 22 and the entire electronic energy conversion part are housed inside the housing 20, which is hermetically sealed, for example with a minimum IP 54°, according to the international standard by the International Electrotechnical Commission on sealing (reiterated by European standard EN 60529).

Figure 5:
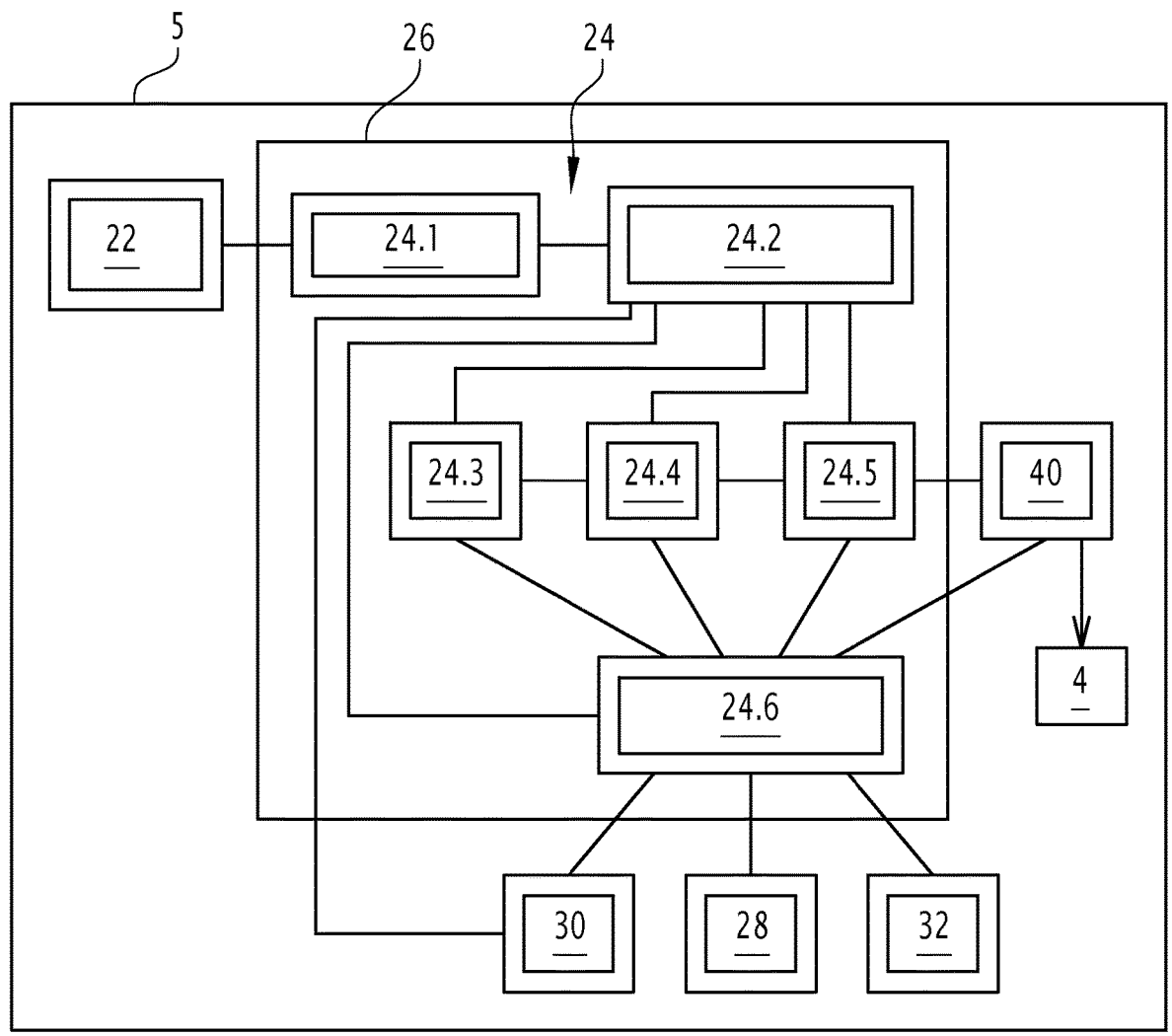
FIG. 5 is a diagram of the connections between the various components and members of the assembly of FIG. 4, in particular between the energy conversion components.

As shown in FIG. 5, the electronic components 24 comprise one or several members 24.1 for protecting the battery elements 22. These members 24.1 make it possible to disconnect the elements in case of overcurrent, i.e., when the presence of an excessive current is detected. In particular, these members 24.1 may comprise one or several diodes, in particular Zener diodes, resistances, or capacitors, used at a load factor of less than or equal to ⅓ of their nominal capacity, which makes it possible to consider them infallible components within the meaning of standard EN 62061.

The electronic components 24 also comprise a control system 24.2 responsible for controlling the energy drawn from the elements 22 and dissipating any surplus energy. In particular, this control system 24.2 comprises step-up and step-down transformers.

SEPIC ("Single-Ended Primary Inductor Converter") converters 24.3, an inverter 24.4, a variable frequency drive 24.5 and an electronic control unit 24.6 are also found. The electronic control unit 24.6 advantageously comprises a processor that in particular controls the converters 24.3, the inverter 24.4 and the variable frequency drive 24.5.

Advantageously, the electronic components 24 are components which, in the field of ATEX zone security, are qualified as infallible according to standard EN 62061. In theory, no electronic component is infallible. Within the meaning of the regulations applicable to ATEX, and therefore within the meaning of the present document, it is the manner in which the components are used that makes them infallible.

In particular, the components 25 are qualified as infallible because on the one hand, they are advantageously selected from among the best scored in their category, in terms of quality and reliability. The scores are assigned from among the ranking published by the International Electrotechnical Commission, document IEC61508. On the other hand, each electronic component 24 is provided in several copies to perform a same function (hardware redundancy) or oversized relative to the application in question. In the latter case, this means that the component is dimensioned to work below capacity relative to its rated power under normal operating conditions, in particular at one third of its rated power. In other words, a safety factor (or coefficient) is used of about 3.

The rated power is the power received by a component when it is working under normal conditions. In reality, the electrical power supplied to the component must correspond to its rated power. If it is greater than its rated power, there is a risk of damage. Let us consider the example of a resistance, assuming that the resistance is provided to dissipate an electrical power of about 0.33 Watts under normal conditions; the resistance that will be selected will then have a rated power of about 1 Watt, or 3 times more than necessary.

The same effect can be obtained by providing redundancies, i.e., by multiplying the number of components that are normally necessary by three (double redundancy). Thus, to return to the preceding example, instead of having one resistance having a rated power of 0.33 Watts, three resistances in series will be used, each having a rated power of 0.33 Watts. The principle is as follows: the system must be capable of withstanding two failures occurring simultaneously. Thus, in the event that two resistances burn out, the energy dissipation must still be able to be provided by the third resistance.

Advantageously, the elements 22 are of the rechargeable type. The generator 2 therefore comprises a recharging interface (not shown).

The sprayer 4 is a gun comprising a high-voltage unit 40, designed to electrostatically charge the coating product according to a certain voltage/current characteristic when it is supplied with electrical energy. The high-voltage unit 40 comprises multiplier members and a transformer to elevate the voltage level.

The voltage/current characteristic of the high-voltage unit corresponds to the ratio between the voltage and the current delivered by the high-voltage unit. It is therefore a curve representative of the evolution of the voltage as a function of the current. Typically, the characteristic is a line with a negative slope.

The voltage/current characteristic is adjusted as a function of the spraying distance. In particular, the voltage is increased as one moves the sprayer away from the part to be coated. Conversely, the voltage drops as one moves the sprayer closer to the part to be coated. The characteristic is advantageously adjusted automatically owing to the continuous and rapid analysis of the evolution of the current consumption as a function of time (dI/dt), the dynamic analysis of this parameter by the microprocessor 24.6 making it possible to account very precisely for the distance between the spray gun and the part to be painted and their relative approach speed.

The high-voltage unit 40 is supplied with low voltage via a power cable 12, which is connected to the generator 2.

Figure 2:
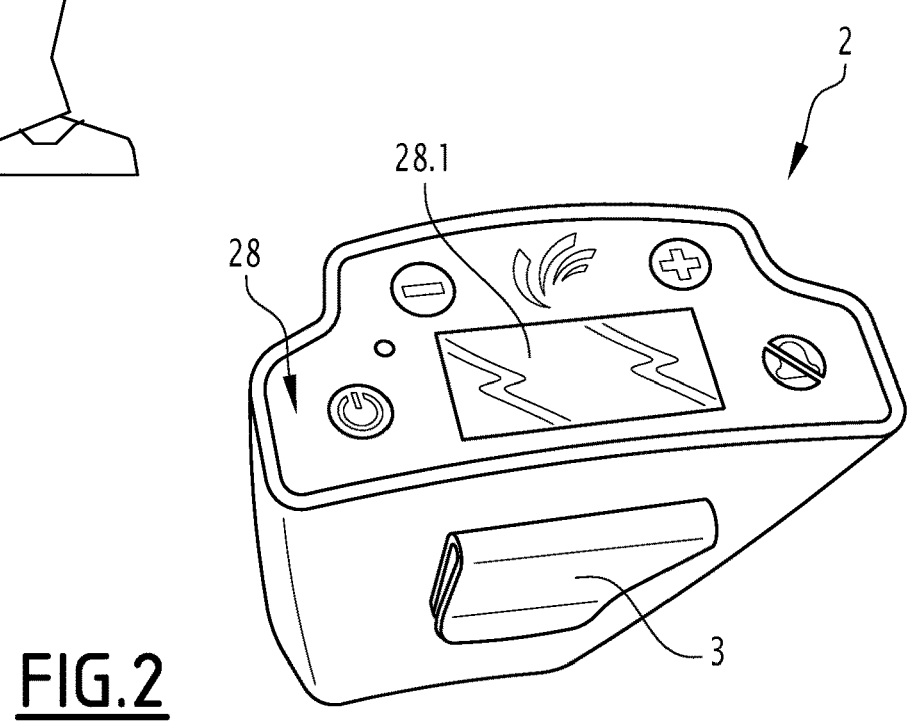
FIG. 2 is an enlarged view, from another angle, of the generator of FIG. 1.

As shown in FIG. 2, the generator 2 preferably comprises a man-machine interface (MMI) 28 located on one face of the housing 20. The interface 28 comprises two adjustment buttons "+" and "−", making it possible to select a voltage/current characteristic, an on/off button and a display screen 28.1. For example, the screen 28.1 can be used to display the selected voltage/current characteristic and/or the overall charge level of the battery 23.

Reference 30 designates the connection of the generator 2 for the connection of the power cable 12 of the high-voltage unit 40.

The sprayer 4 is supplied with coating product by a hose 6, which is qualified as product intake hose, and compressed air by a hose 8, which is qualified as air intake hose. The hose 8 therefore extends between the sprayer 4 and a compressed air source (not shown). The hose 6 extends between the sprayer 4 and the product supply source.

Advantageously, this compressed air source and/or this product supply source are connected to the ground. The air intake hose 8 and/or the product intake hose 6 have an electrical resistance below 1 MOhm (Mega Ohm), so as to connect the sprayer 4 to the ground. In reality, given that the grip 42 of the sprayer 4 is grasped by the operator 1, the latter must always be grounded. In the prior art, there was therefore at least one, preferably two connections between the grip of the gun and the carcass of the generator, which was connected directly to the ground. Yet in the invention, the generator 2 is carried by the operator 1 and therefore cannot be connected to the ground directly. The idea is therefore to connect the generator 2 to the ground via the grip 42 of the gun and the hoses 6 and 8 bringing the product and the compressed air used for spraying, by providing an electrically conductive cable 12 connecting the generator 2 and the sprayer 4.

Advantageously, the hoses 6 and/or 8 are made from an electrically conductive material, for example polymer, and have a resistance per unit length below 20 kOhm per meter, such that the length of the hoses 6 and/or 8 can reach up to 50 meters at most, or even up to 100 meters if one adds the resistance of the two hoses. Thus, the operator 1 will not be limited by the length of the hose during his movements inside the spray booth (not shown).

Preferably, and still to increase security, the electrically conductive cable 12 for connecting to the ground typically has multiple strands (or multiple wires).

The hoses 6 and/or 8 are simultaneously conductive on their inner and outer surfaces and in their mass, i.e., in their thickness. Under these conditions, they can be likened to multi-wire conductors.

Advantageously, the generator 2 is equipped with an interface 32 that can be qualified as maintenance interface. This interface is shown schematically only in FIG. 5. It is in fact a connection port for connecting an analysis tool (not shown), such as a diagnostic kit. Such a tool makes it possible to recover a certain amount of information, for example the charge level of the batteries 22, the number of actions on the trigger of the gun, the cumulative operating duration of the high-voltage unit 40, etc. To that end, the electronic control unit 24.6 and the high-voltage unit 40 can be connected by a cable serving to transport information (digital and/or analog).

In an alternative that is not shown, the generator 2 could assume the form of a backpack or a harness system or be mounted on an independent carriage rolling on the ground.

According to another alternative that is not shown, the interface 28 could comprise one or several LEDs, in particular three LEDs. A green LED may be illuminated under normal operating conditions, an orange LED may be illuminated when the batteries 22 are for example at 10% of their capacity and a red LED may be illuminated in case of imminent loss of autonomy, i.e., when the batteries are practically empty. Advantageously, the red LED may blink 2 or 3 minutes before the current is cut.

The features of the main embodiment and alternatives not shown considered above may be combined with one another to create new embodiments of the invention.

The invention claimed is:

1. An assembly comprising:
   an electrostatic sprayer for a coating product;
   a generator configured to supply said electrostatic sprayer with an electrical current and an electrical voltage, the product of the electrical current and the electrical voltage being greater than or equal to 8 Watts;
   a compressed air source connected to an electrical ground;
   at least one air intake hose connecting said compressed air source to said electrostatic sprayer, each air intake hose having an electric resistance below 1 MOhm, so as to connect said electrostatic sprayer to the electrical ground; and
   at least one electrically conductive cable connecting said generator and said electrostatic sprayer, so as to connect said generator to the electrical ground.

2. The assembly according to claim 1, wherein said generator has a mass that is below 2 kg and a volume that is below 2000 cubic centimeters.

3. The assembly according to claim 1, wherein said generator comprises at least one battery element.

4. The assembly according to claim 3, wherein said generator comprises several battery elements together forming a battery.

5. The assembly according to claim 3, wherein each battery element comprises an outer overmolding made from an electrically insulating material.

6. The assembly according to claim 5, wherein each battery element comprises connection terminals, each connection terminal comprising an overmolding made from an electrically insulating material.

7. The assembly according to claim 1, wherein said generator comprises electronic energy conversion components.

8. The assembly according to claim 7, wherein said electronic energy conversion components are encapsulated inside a resin enclosure.

9. The assembly according to claim 1, wherein the product of the electrical current and the electrical voltage is greater than 10 Watts.

10. The assembly according to claim 1, wherein each air intake hose has a resistance per unit length below 20 kOhm per meter.

11. The assembly according to claim 8, wherein each electronic energy conversion component is configured to perform a function, and wherein a plurality of identical electronic energy conversion components are configured to perform each function.

12. An assembly comprising:
    an electrostatic sprayer for a coating product;
    a generator configured to supply said electrostatic sprayer with an electrical current and an electrical voltage, the product of the electrical current and the electrical voltage being greater than or equal to 8 Watts;
    a product supply source connected to an electrical ground;
    at least one product intake hose connecting the product supply source to said electrostatic sprayer, each product intake hose having an electric resistance below 1 MOhm, so as to connect said electrostatic sprayer to the electrical ground; and
    at least one electrically conductive cable connecting said generator and said electrostatic sprayer, so as to connect said generator to the electrical ground.

13. The assembly according to claim 12, wherein each product intake hose has a resistance per unit length below 20 kOhm per meter.

* * * * *